US011706382B2

(12) United States Patent
Davidson et al.

(10) Patent No.: US 11,706,382 B2
(45) Date of Patent: *Jul. 18, 2023

(54) METHODS AND APPARATUS FOR ENCRYPTING CAMERA MEDIA

(71) Applicant: GoPro, Inc., San Mateo, CA (US)

(72) Inventors: Craig Davidson, Cardiff, CA (US); David Newman, Del Mar, CA (US)

(73) Assignee: GoPro, Inc., San Mateo, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/371,077

(22) Filed: Jul. 8, 2021

(65) Prior Publication Data

US 2021/0337162 A1 Oct. 28, 2021

Related U.S. Application Data

(63) Continuation of application No. 16/107,744, filed on Aug. 21, 2018, now Pat. No. 11,064,153.

(51) Int. Cl.
G06F 21/78 (2013.01)
H04N 5/913 (2006.01)
G06F 12/14 (2006.01)

(52) U.S. Cl.
CPC ......... H04N 5/913 (2013.01); G06F 12/1408 (2013.01); G06F 21/78 (2013.01); G06F 2212/1052 (2013.01); H04N 2005/91307 (2013.01)

(58) Field of Classification Search
None
See application file for complete search history.

(56) References Cited

U.S. PATENT DOCUMENTS

| 6,674,874 | B1* | 1/2004 | Yoshida | G06T 1/0085 |
| | | | | 713/176 |
| 8,365,214 | B2* | 1/2013 | Soo | H04N 7/17318 |
| | | | | 725/147 |
| 8,850,498 | B1* | 9/2014 | Roach | H04N 21/47202 |
| | | | | 725/91 |
| 9,167,280 | B2* | 10/2015 | Wingert | H04N 21/85406 |
| 10,321,143 | B1* | 6/2019 | Mayle | H04N 19/33 |
| 2004/0174998 | A1 | 9/2004 | Youatt | |
| 2008/0074277 | A1* | 3/2008 | Singh | H04N 21/4882 |
| | | | | 340/686.1 |
| 2008/0273698 | A1* | 11/2008 | Manders | H04N 21/44008 |
| | | | | 386/E5.052 |
| 2009/0021591 | A1* | 1/2009 | Sako | H04N 1/00912 |
| | | | | 348/E5.042 |

(Continued)

Primary Examiner — Trang T Doan
(74) Attorney, Agent, or Firm — Esplin & Associates, PC

(57) ABSTRACT

Apparatus and methods for encrypting captured media. In one embodiment, the method includes capturing media data via use of a lens of an image capture apparatus; obtaining a number used only once (NONCE) value from the captured media data; obtaining an encryption key for use in encryption of the captured media data; using the obtained NONCE value and the obtained encryption key for encrypting the captured media data; and storing the encrypted media data. In some variants, the media is encrypted prior to storage, thereby obviating any instances in which the captured media data resides in a wholly unencrypted instance. Apparatus and methods for decrypting encrypted captured media are also disclosed.

17 Claims, 7 Drawing Sheets

(56) References Cited

U.S. PATENT DOCUMENTS

| | | | |
|---|---|---|---|
| 2009/0136030 A1* | 5/2009 | Xie | H04N 7/167 380/210 |
| 2009/0268902 A1* | 10/2009 | Fascenda | H04L 9/0897 380/44 |
| 2010/0325656 A1* | 12/2010 | Hardacker | H04N 21/47202 725/31 |
| 2011/0055886 A1* | 3/2011 | Bennett | H04L 63/18 370/328 |
| 2013/0169863 A1* | 7/2013 | Smith | H04N 7/01 348/441 |
| 2013/0329009 A1* | 12/2013 | Nakayama | H04N 19/423 348/43 |
| 2014/0016907 A1* | 1/2014 | Kono | H04N 5/213 386/230 |
| 2016/0094846 A1* | 3/2016 | Lee | H04N 19/176 375/240.03 |
| 2017/0228525 A1* | 8/2017 | Wajs | H04N 21/2541 |
| 2017/0310488 A1* | 10/2017 | Wajs | H04L 9/3271 |
| 2018/0249190 A1* | 8/2018 | Wu | H04N 21/2743 |
| 2019/0156044 A1* | 5/2019 | Adams | G06F 21/602 |

\* cited by examiner

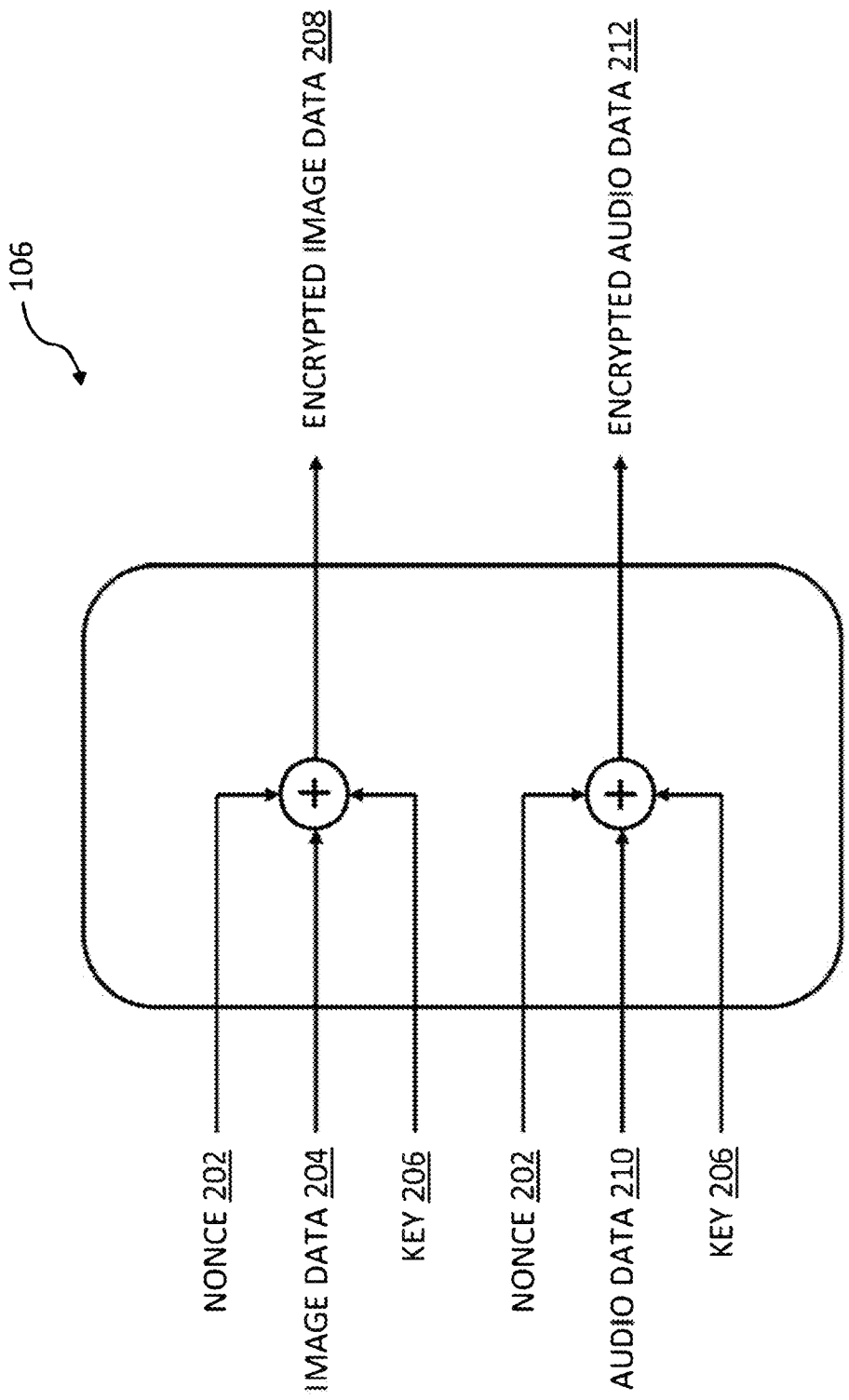

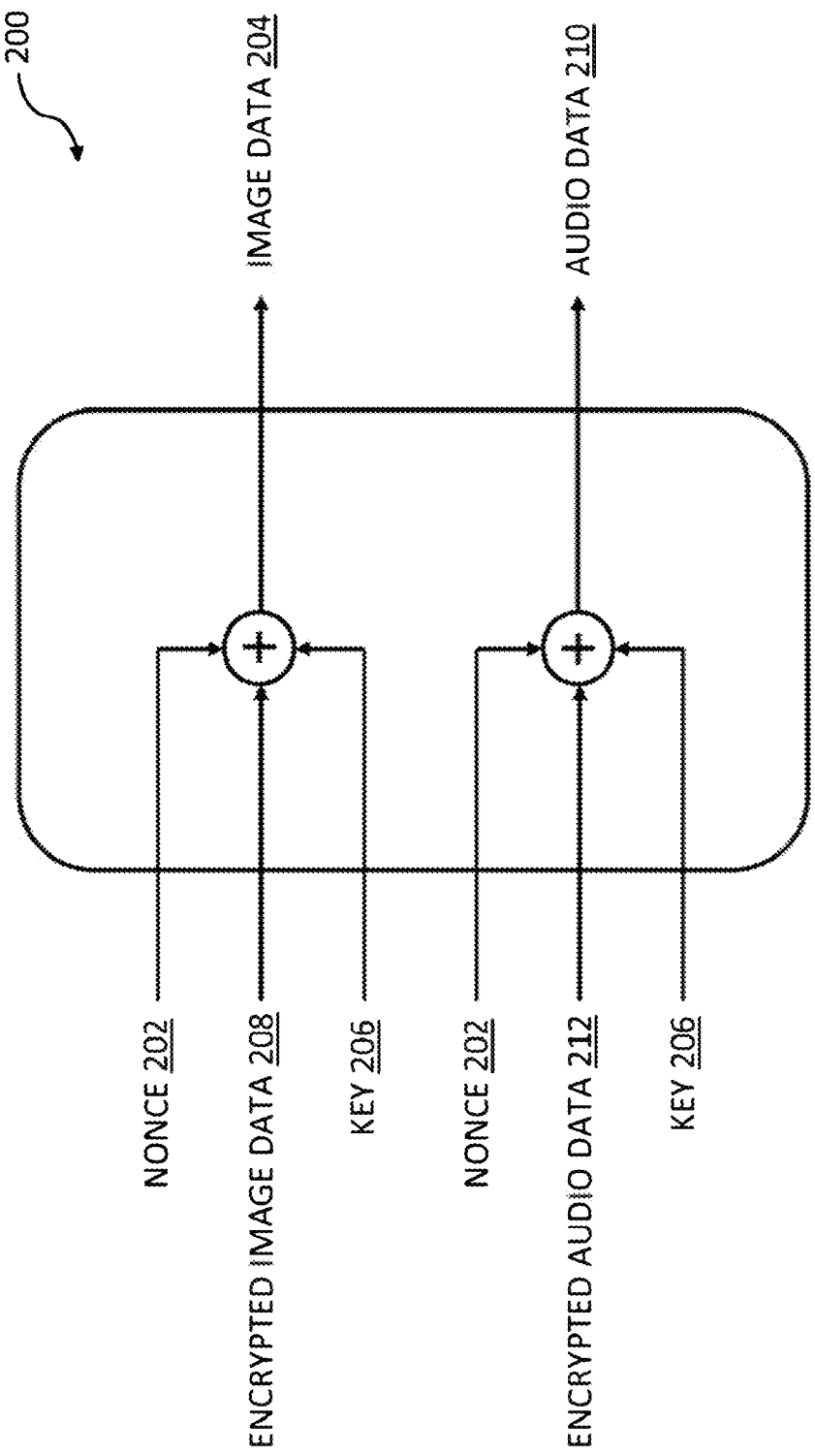

METHODS AND APPARATUS FOR ENCRYPTING CAMERA MEDIA

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to camera media storage and in one exemplary aspect, to methods and apparatus for encrypting audio/imaging data prior to its storage in memory as well as methods and apparatus for decrypting the same.

Description of Related Art

Digital image capture devices may capture video, audio, and/or still images (collectively referred to as "camera media") and store this captured camera media in, for example, memory located on the image capture device itself. For example, many digital image capture devices store captured camera media in flash memory cards or other types of fixed or removable memory. This captured camera media may be stored in a variety of imaging file formats including, for example, a Joint Photography Experts Group (JPEG) file format, a Tagged Image File Format (TIFF), as well as various types of Raw imaging formats. Metadata such as, for example, aperture settings, exposure time, focal length, date and time taken, and location information, provide additional information with regards to this captured camera media.

Typically, captured camera media is stored in the "clear" (i.e., it is not encrypted) so that their contents are generally readily accessible to anyone with physical access to the captured camera media content. While in most usage scenarios such non-encrypted storage is acceptable, there are a number of scenarios where a user of the image capture device may prefer a more secure way of storing their captured camera media. For example, journalists that capture imaging content in more restrictive regimes (e.g., North Korea) may be concerned that the government may confiscate their cameras and/or confiscate/delete their captured content. As but another non-limiting example, public safety personnel (e.g., police, fire, and healthcare services) may wish to store captured content in a manner where privacy considerations for this captured content are taken into consideration.

While techniques exist that enable the encryption/decryption of this captured content, extant methodologies may still provide for sub-optimal security of this captured content. For example, in the aforementioned restrictive regime scenario, existing encryption technologies may prove adequate in restricting access to the imaging contents contained in memory. However, the mere fact of knowledge that encrypted content is stored in memory, even if inaccessible, may result in these devices being confiscated and/or destroyed. Accordingly, improved methods and apparatus for the encrypting/decrypting of captured imaging content are needed in order to address the foregoing deficiencies of the prior art. Additionally, such improved methods and apparatus will ideally minimize processing resources while providing the desired level of security for this captured imaging content.

SUMMARY

The present disclosure satisfies the foregoing needs by providing, inter alia, methods and apparatus for providing improved encryption/decryption of captured content.

In one aspect, a method for encrypting imaging/audio data is disclosed. In one embodiment, the method includes capturing imaging data via use of a lens of an image capture apparatus; obtaining a number used only once (NONCE) value from the captured imaging data; obtaining an encryption key for use in encryption of the captured imaging data; using the obtained NONCE value and the obtained encryption key for encrypting the captured imaging data; and storing the encrypted imaging data.

In one variant, the encrypting of the captured imaging data includes encrypting only a portion of a frame of the captured imaging data.

In another variant, the encrypting of only the portion of the frame of the captured imaging data includes using the encryption key for determining which portions of the frame of the captured imaging data to encrypt.

In yet another variant, the method further includes distributing the portions of the frame of the frame of the captured imaging data to encrypt in accordance with a non-linear mathematical relationship.

In yet another variant, the obtaining of the encryption key for use in the encryption of the captured media includes capturing an image using the lens of the image capture device.

In yet another variant, the method further includes encoding the image with the encryption key.

In another aspect, a method for decrypting imaging/audio data is disclosed. In one embodiment, the method includes retrieving encrypted media content; obtaining a NONCE value from the encrypted media content; obtaining a decryption key used for decryption; using the obtained NONCE value and the obtained decryption key for decryption of the encrypted media content; and displaying the decrypted media content.

In yet another aspect, a computer-readable storage apparatus is disclosed. In one embodiment, the computer readable apparatus includes a storage medium having computer instructions stored thereon, the computer instructions being configured to, when executed: capture imaging data via use of a lens of an image capture apparatus; obtain a number used only once (NONCE) value from the captured imaging data; obtain an encryption key for use in encryption of the captured imaging data; use the obtained NONCE value and the obtained encryption key for encryption of the captured imaging data; and store the encrypted imaging data.

In one variant, the encryption of the captured imaging data includes encryption of only a portion of a frame of the captured imaging data.

In another variant, the encryption of only the portion of the frame of the captured imaging data includes use of the encryption key for determination of which portions of the frame of the captured imaging data to encrypt.

In yet another variant, the computer instructions are further configured to, when executed, distribute the portions of the frame of the frame of the captured imaging data to encrypt in accordance with a non-linear mathematical relationship.

In yet another variant, the obtainment of the encryption key for use in the encryption of the captured media includes a capture of an image using the lens of the image capture device.

In yet another variant, the computer instructions are further configured to, when executed encode the image with the encryption key.

In yet another variant, the obtained NONCE value is used for encryption of a series of frames, the series of frames including one or more I-frames, one or more P-frames and one or more B-frames, the obtained NONCE value being generated from at least one of the one or more I-frames.

In yet another variant, the captured imaging data and the captured audio data are converted into a frame of media content, the frame of media content including an indexing portion, and encryption of the frame of media content results in an encrypted frame of media content, the encrypted frame of media content including a non-encrypted version of the indexing portion.

In yet another aspect, an integrated circuit (IC) apparatus is disclosed. In one embodiment, the IC apparatus is configured to capture imaging data via use of a lens of an image capture apparatus; obtain a number used only once (NONCE) value from the captured imaging data; obtain an encryption key for use in encryption of the captured imaging data; use the obtained NONCE value and the obtained encryption key for encryption of the captured imaging data; and store the encrypted imaging data.

In yet another aspect, a computing device is disclosed. In one embodiment, the computing device includes a processor apparatus and a computer-readable storage apparatus, the computer readable apparatus including a storage medium having computer instructions stored thereon, the computer instructions being configured to, when executed by the processor apparatus: capture imaging data via use of a lens of an image capture apparatus; obtain a number used only once (NONCE) value from the captured imaging data; obtain an encryption key for use in encryption of the captured imaging data; use the obtained NONCE value and the obtained encryption key for encryption of the captured imaging data; and store the encrypted imaging data.

In yet another aspect, an image capture device is disclosed. In one embodiment, the image capture device includes one or more image sensors that generate imaging data; one or more microphones that generate audio data; an encryption engine that generates a number used only once (NONCE) value from the generated imaging data, the encryption engine further configured to use an encryption key and the generated NONCE value in order to encrypt the generated imaging data and the generated audio data; and a memory for storage of the encrypted imaging data and the encrypted audio data.

In one variant, the generated imaging data and the generated audio data are not stored within the image capture device prior to encryption.

In another variant, the encryption key is captured by the one or more image sensors.

In yet another variant, a size for the generated imaging data and the generated audio data and a size for the encrypted imaging data and the encrypted audio data are the same.

In yet another variant, the generated NONCE value is used for encryption of a series of frames, the series of frames comprising one or more I-frames, one or more P-frames and one or more B-frames, the generated NONCE value being generated from at least one of the one or more I-frames.

In yet another variant, the generated imaging data and the generated audio data are converted into a frame of media content, the frame of media content including an indexing portion, and encryption of the frame of media content results in an encrypted frame of media content, the encrypted frame of media content including a non-encrypted version of the indexing portion.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

FIG. 2A is a block diagram of an exemplary encryption apparatus, useful in describing the principles of the present disclosure.

FIG. 2B is a block diagram of an exemplary decryption apparatus, useful in describing the principles of the present disclosure.

All Figures disclosed herein are © Copyright 2021 GoPro, Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while primarily discussed in the context of encrypting/decrypting media within the context of a stand-alone camera (e.g., a GoPro Fusion® camera manufactured by the Assignee hereof, a GoPro Hero® camera, etc.), the present disclosure is not so limited. In fact, the methodologies and apparatus described herein may be readily applied to other types of image capture devices or non-image capture devices. For example, the principles of the present disclosure may be readily applied to other types of computing devices such as, for example, a desktop computer, a laptop computer, a tablet computer, etc. whether they are capable of image capture or otherwise.

These and other variations would be readily apparent to one of ordinary skill given the contents of the present disclosure.

Exemplary Encoding/Decoding Capture Apparatus—

Figure 1:
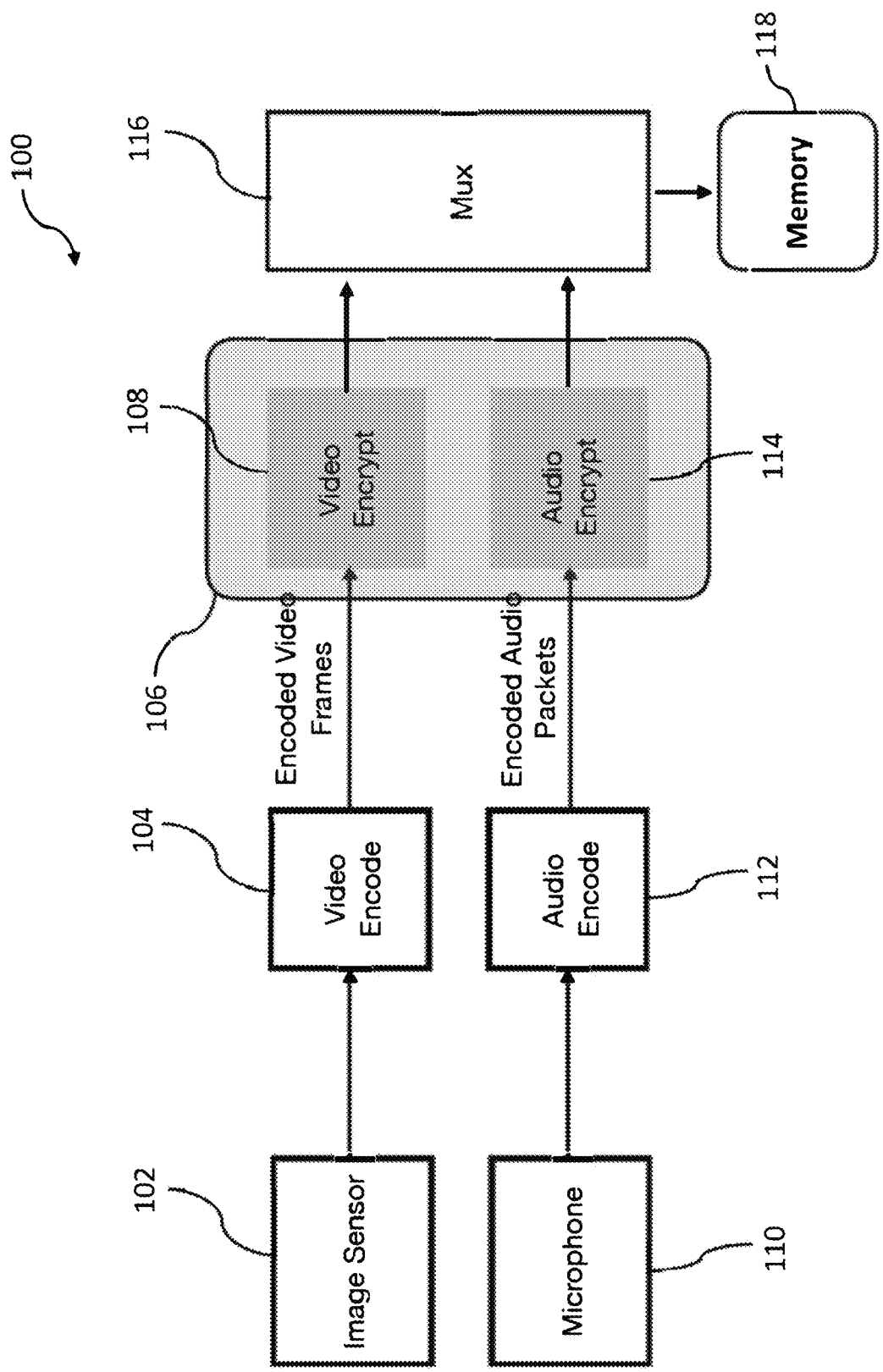
FIG. 1 is a block diagram of an exemplary capture device that encrypts captured content in accordance with the principles of the present disclosure.

Referring now to FIG. 1, an exemplary capture device 100 that encrypts captured content is shown and described in detail. The capture device 100 may include one or more image sensors 102. The one or more image sensors 102 may capture digital images (e.g., still photos) or video. In the context of captured video, the images captured can be thought of as a sequence of images (or a sequence of "frames"). Each captured image may include a two-dimensional array of pixels. The captured images or frames depict a "scene," which may include, for example, landscape, people, objects, that are each represented by captured pixels. Each pixel represents a depicted point in a scene captured in, for example, the digital video. Furthermore, each pixel is located at a pixel location, referring to, for example, (x,y) coordinates of the pixel within the image or frame. For example, a pixel may comprise {Red, Green, Blue} (RGB) values describing the relative intensities of the colors sensed by the one or more image sensors 102 at a particular set of (x,y) coordinates in the frame. In some implementations, the one or more image sensors 102 may capture video suitable for providing output videos having high definition resolutions (for example, 4K resolution, 2K resolution, 1080p, 1080i, 960p, 720p and the like), standard definition resolutions, or other types of resolutions. The one or more image sensors 102 may capture video at one or more frame rates such as, for example, 120 frames per seconds (FPS), 60 FPS, 48 FPS, 30 FPS and any other suitable frame rate. Additionally, the one or more image sensors 102 may include a lens that allows for wide-angle or ultra wide-angle video capture having a field of view (FOV) of, for example, 90 degrees, 127 degrees, or 170 degrees, 180+ degrees, although other FOV angles may be used.

For example, in the context of the GoPro Fusion® series of cameras manufactured by the Assignee hereof, the image capture device 100 may include a pair of image sensors (with respective lens') that are arranged in a generally back-to-back orientation with each of the image sensors capturing a hyper-hemispherical FOV. In the context of a traditional GoPro Hero® series of cameras manufactured by the Assignee hereof, a single image sensor 102 may capture a scene. The capture device 100 may further include one or more microphones 110 that capture the sounds associated with, for example, a captured scene. For example, in some implementations, a plurality of microphones 110 are utilized by the capture device 100 in order to provide, inter alia, directionality of sound for objects within the captured scenes. In some implementations, a single microphone 110 may be present on the capture device 100. These and other variations would be readily apparent to one of ordinary skill given the contents of the present disclosure.

In some implementations, the capture device 100 may further include a video encoder 104 and an audio encoder 112. Each of the video encoder 104 and audio encoder 112 may be embodied as a combination of hardware and software that compresses the captured video and captured audio, respectively. Compression may be achieved through a so-called codec, which is a concatenation of the terms "encoder" and "decoder". For example, the video encoder 104 may constitute one or more video codecs such as, for example, an H.265/MPEG-H HEVC codec, an H.264/MPEG-4 AVC codec, an H.263/MPEG-4 Part 2 codec, an H.262/MPEG-2 codec, etc. Generally speaking, the video encoder 104 may include one or more of a so-called lossless compression algorithm, or lossy compression algorithm. The audio encoder 112 may further include one or more of various types of codecs including, without limitation, non-compression formats, lossless compression formats, lossy compression formats, and/or other types of codecs. Once the images (e.g., video) and/or audio has been encoded, these encoded image and audio packets are passed along to an encryption engine 106. In some implementations, the encryption engine 106 may be a part of the video encoder 104 and/or the audio encoder 112.

The encryption engine 106 may be configured to encrypt images (e.g., video) and/or audio, via a video encrypt mechanism 108 and audio encrypt mechanism 114, respectively. The encrypt mechanisms 108, 114 may include one of a symmetric key/private key encryption mechanism or a public key encryption mechanism. In symmetric key schemes, the encryption keys and decryption keys are the same. In public-key encryption schemes, the encryption key may be published for anyone to use and encrypt data, however, the party that wishes to decrypt the encrypted images or audio must have access to a decryption key that enables data to be decrypted and read. The encrypt mechanisms 108, 114 may utilize a block cipher such as, for example, the Advanced Encryption Standard (AES) 128-bit block cipher. The encryption engine 106 may perform encryption on, for example, a frame-by-frame basis prior to the multiplexing of the encrypted video and encrypted audio via a multiplexer (MUX) 116, and prior to being stored to memory 118. In other words, such a capture device 100 as illustrated is advantageous as the captured images and audio are encrypted prior to being stored, thereby protecting its contents from, for example, access by unwanted third parties.

Referring now to FIG. 2A, one exemplary implementation of an encryption engine 106 is shown and described in detail. In the illustrated implementation, the encrypted image data 208 is encrypted as follows. Imaging data 204 is input into the encryption engine 106. Along with the imaging data 204, a number used only once (NONCE) 202 and an encryption key 206 is also input into the encryption engine 106. Accordingly, via the use of a NONCE input 202, imaging data 204 (e.g., a frame of imaging data) and a key 206, the image data 204 may be encrypted in order to generate encrypted image data 208. The specific encryption methodologies are well understood (e.g., in the context of AES 128-bit block cipher encryption), and hence will not be described in subsequent detail herein. However, the encryption inputs 202, 206 for use with encryption will be described in detail subsequently herein.

As the term implies, the NONCE 202 may be an arbitrary number that may be used just once. The NONCE 202 is often times random (or pseudo-random) in order to ensure, inter alia, that prior communications cannot be used in so-called replay attacks. In some implementations, the NONCE 202 constitutes the first line (or segment) of a frame of captured image data. In other words, as every captured frame (or image) may be considered "unique", this imaging data provides for the random nature required for its use as a NONCE 202. This NONCE 202 may be of a fixed size (e.g., sixteen (16) bytes), although it would be appreciated that other fixed sizes, as well as variable sized NONCE 202 data may be utilized in some implementations. Variable sized NONCE 202 data may increase the security of the encryption while adding a moderate level of additional complexity to the encryption. While the first line (or segment) of the captured imaging data may theoretically be recreated by precisely capturing the same scene, it would be difficult (if not impossible) to recreate the precise scene captured spatially (e.g., from the same spot) as well as temporally (e.g., at the same time of day, or under the precise same lighting conditions, etc.). Additionally, these captured images may be made "more random" by imaging sensor noise that is common to, for example, all video cameras. In some implementations, the NONCE 202 may be obtained from other portions of the frame (e.g., in the audio portion of the captured frame). As a brief aside, the audio portion of the frame may be less "random" than the imaging portion of the frame and hence may be more undesirable in some implementations. However, using the audio portion of the frame may be acceptable for use as the NONCE 202 value in some implementations.

In some implementations, each captured frame of imaging data may utilize its first line (or segment) for encryption of the captured imaging data. In some implementations, this first line (or segment) may reside in other portions of the captured imaging data. In other words, this first line (or segment) doesn't necessarily need to reside at the beginning of the frame. For example, other lines (or segments) of the imaging data may be used as a NONCE 202 (e.g., in the middle of the frame of imaging data, at the end of the frame of imaging data, at other portions of the frame of imaging data, etc.). That is, the first line (or segment) doesn't necessarily have to reside temporally or spatially "first" within the frame of imaging data. Additionally, the positioning of the NONCE 202 within the frame of imaging data may vary from frame to frame. In other words, a first frame may supply its NONCE 202 value within a first portion of the frame, while a second frame may supply its NONCE 202 value within a second distinct portion of the frame. Again, by varying the positioning of the NONCE 202 data value from frame-to-frame, additional security for the encryption may be obtained, while adding a moderate level of additional complexity to the encryption (and decryption) process.

In variants, a first line (or segment) of a given captured frame may be used for the encryption of a sequence of frames. For example, in video compression a video frame is compressed using different algorithms that are mainly centered on the amount of data compression. Many of these video compression algorithms commonly use three (3) different frame types, i.e., (1) an I-frame which may be the least compressible, but doesn't require other video frames for decode; (2) a P-frame that utilizes data from prior frame(s) to decompress and hence are more compressible than I-frames; and (3) a B-frame that may use both previous and forward frames for data reference in order to achieve the highest amount of data compression as compared with I-frames and P-frames. Accordingly, the first line (or segment) of, for example, an I-frame may be used as the NONCE 202 for all the P-frames and B-frames that follow.

The NONCE 202 used for the encryption of the audio data 210 may differ from the NONCE 202 used for the encryption of the imaging data 204, or alternatively may be the same temporally used NONCE 202 as the imaging data 204. For example, in some implementations audio encryption may use the NONCE 202 from the captured I-Frame. Accordingly, any audio packet 210 that starts at the same time (or after a given I-frame) may be encrypted using the same NONCE 202 that is used for image encryption. In some implementations, the audio data 210 may use a different NONCE 202, than the NONCE 202 utilized for image encryption. As a brief aside, the use of a NONCE 202 generated from the imaging data 204 may be utilized as the NONCE for the encryption of the audio data 210 and vice versa; however, the synchronization required may be more complex. Accordingly, in some implementations it may be advantageous from a complexity standpoint to generate an independent NONCE 202 for encryption of the audio data 210. For example, a first segment of captured audio data may be utilized for the generation of the NONCE 202 for use in audio encryption. In some implementations, the NONCE 202 used for encryption of imaging data 204 and/or audio data 210 may be independent from the underlying captured image/audio data. For example, the NONCE(s) 202 generated may be output from a random (or pseudo-random) number generator. These and other variants would be readily apparent to one of ordinary skill given the contents of the present disclosure.

In addition to the aforementioned NONCE 202, the encryption engine 106 also takes as input an encryption key 206 for both the image data 204 and audio data 210. While some implementations envision the same encryption key 206 being used for image data 204 and audio data 210, these encryption keys 206 may vary from one another in some implementations. For example, in a situation where the captured image data 204 may require additional security (and vice versa) than the captured audio data 210, the encryption key 206 for the imaging data 204 may require a higher level of security than the encryption key 206 for the audio data 210. These and other variants would be readily apparent to one of ordinary skill given the contents of the present disclosure.

The encryption key(s) 206 may take any of a number of suitable forms. For example, the encryption key(s) 206 may be entered in locally on the image capture device 100 via a suitable user interface (e.g., via a series of button pushes, via a keyboard, via a touch screen, and/or via any other suitable means of entering in encryption key(s) 206) located on the image capture device itself. The encryption key(s) 206 may also be stored as an image file and may be entered (e.g., captured) via, for example, the lenses of the image capture device 100 itself. For example, in some implementations, the image file may take the form of a QR code. Accordingly, by capturing the QR code with the image capture device 100, the encryption key(s) 206 may be entered into the encryption engine 106 for encryption (and decryption) of the captured image/audio data. In some implementations, it may be desirable for the encryption key(s) 206 to be stored remotely. For example, the encryption key(s) 206 may only be accessible through, for example, a secure virtual private network (VPN) tunnel. Such an implementation may be desirable as it adds an additional layer of security in order to encrypt/decrypt the captured image/audio data. Access to the secure VPN tunnel may use a variety of authentication methods including, without limitation, passwords, tokens and/or other unique identification methods. In some implementations, the encryption key(s) 206 may be generated by a remote computing device (e.g., a smartphone, laptop, desktop, or other computing device) and may be transmitted/received via a variety of wired and/or wireless interfaces (e.g., Bluetooth® Low Energy (BLE), Wi-Fi and/other types of wireless interface(s)). The "encryption" key(s) 206 may also enable a user to turn on/off encryption during capture. For example, one QR code may enable encryption, while a second QR code may disable encryption. These QR codes may be encoded with a message such as, for example, "Encrypt with this key='xyz?'" that enables encryption, while another QR code may set the encryption key to nothing, thereby disabling encryption. These and other variants would be readily apparent to one of ordinary skill given the contents of the present disclosure.

Referring now to FIG. 2B, an exemplary decryption engine 200 is shown and described. The decryption engine 200 may be located on the image capture device 100 itself, or may be located remote from the image capture device (e.g., at a remote computing device) so as to enhance the security of captured image/audio data. The decryption engine 200 may take as input the encrypted image data 208 and encrypted audio data 212 and output decrypted image data 204 and decrypted audio data 210, respectively. The decryption engine 200 may further take as input one or more NONCE(s) 202 and one or more encryption key(s) (also decryption key(s)) 206. The aforementioned NONCE(s) 202 and encryption/decryption key(s) 206 may take any of the aforementioned forms as previously described with respect to, for example, FIG. 2A described supra. For example, the one or more encryption/decryption key(s) 206 may be accessible via a secure VPN tunnel and may further take the form of, for example, a QR code. These and other variants would be readily apparent to one of ordinary skill given the contents of the present disclosure.

Figure 3:
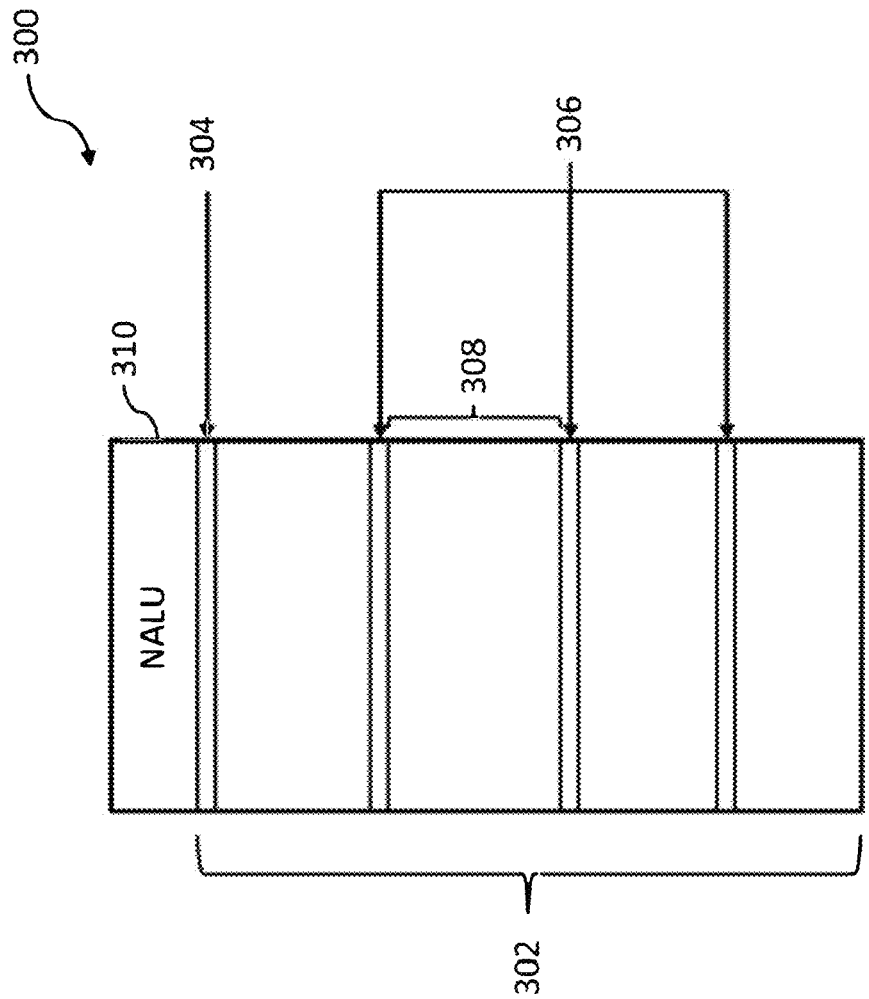
FIG. 3 is a graphical illustration of an exemplary frame of encrypted imaging content, useful in describing the principles of the present disclosure.

Referring now to FIG. 3, an exemplary frame of encrypted captured data 300 is shown and described in detail. Advantageously, the data size for the frame of encrypted captured data 300 may be similar in size (e.g., the same size) as that of the data size for the original frame of natively captured data. For example, as the NONCE value (202, FIGS. 2A-2B) is used both for encryption as well as for display, the frame of encrypted captured data 300 may be of the same size as the non-encrypted version of the frame. In some implementations, the frame 300 may take the form of an MPEG-4 (mp4) file format. The frame 300 may include a portion 310 that includes, for example, a Network Abstraction Layer Unit (NALU). The NALU is used to, inter alia, index the captured content and provide necessary information to the decoder in order to properly decode the captured content. The NALU may be stored in the clear (i.e., not be encrypted), while the payload 302 (or portions thereof) may be encrypted in such a way that its contents are, for example, un-viewable (i.e., encrypted). Storing the NALU in the clear may allow, for example, the timing relationship between the audio and video packets to be known at decoder/decrypt time.

The payload 302 may include a first segment 304 that is to be used as the NONCE (202, FIGS. 2A-2B) for the encryption. In some implementations, the payload 302 may further include portions 308 of the captured content that are not encrypted, while also containing portions 306 that are encrypted. Herein lays a salient advantage of the encryption/decryption methodologies described herein. Namely, as the entirety of the payload 302 isn't encrypted, both encryption and decryption of the captured frame requires less processing and memory resources as compared with a frame 300 in which the entirety (or near entirety) of the payload 302 is encrypted. While the entirety of the payload 302 may be encrypted (while still using the first segment as the NONCE (202, FIGS. 2A-2B)), the security of the encrypted payload 302 may not significantly increase. This is resultant from the fact that a relatively small portion of the payload 302 (e.g., 3-4%) may be encrypted that is sufficient to "break" downstream decoding tools. In other words, the encrypted portions 306 may be enough to prevent intelligible decode of the non-encrypted portions 308 of the payload 302. In addition to requiring less processing and memory resources as compared with a frame 300 in which the entirety (or near entirety) of the payload 302 is encrypted, this reduced amount of encryption makes processing faster (less computationally expensive) on both the encode and decode side of the encoding/decoding process.

In some implementations, the striping (offset) of encrypted line(s) 306 of frame data may be separated from one another by a set given amount (e.g., every thirty-two (32) lines of frame data as but one non-limiting example). In other words, the spacing between encrypted lines 306 of frame data may always be the same throughout the frame 300. However, in some variants it may be desirable to vary this striping (offset) either: (1) throughout the encrypted frame (e.g., at lines four, eight, ten, fourteen, twenty, etc.); or (2) at varying fixed intervals (e.g., in one frame, payload may be striped every thirty lines, while another frame may be striped every twenty-eight lines). Such an implementation may make the underlying frame payload data 302 harder to determine as one attempting to decrypt the encrypted lines 306 of payload data would: (1) not only need to determine how to decrypt the encrypted lines 306 of payload data, but also (2) determine which ones of the encrypted lines 306 of payload data are actually encrypted. This may increase the security of the encrypted frame 300 as compared with an encrypted frame 300 in which the striping (offset) of encrypted line(s) 306 of frame data are uniformly positioned throughout a sequence of frames. Additionally, such variants may further reduce the number of encrypted lines 306 required in order to provide comparable security as variants in which the striping (offset) of a sequence of frames was uniform, thereby further reducing the processing overhead and memory requirements for encryption.

In some variants, this variable striping (offset) may be dictated by the encryption key (206, FIGS. 2A and 2B) itself. For example, this encryption key (206, FIGS. 2A and 2B) may not only dictate how the frame payload 302 is encrypted, but also where within the frame payload 302 the encrypted lines 306 of payload data are located. As but one non-limiting example, the encryption key (206, FIGS. 2A and 2B) may be used to dictate that encrypted lines 306 of payload data may be found in accordance with a linear or non-linear mathematical relationship (e.g., a Fibonacci sequence) where the decoder may determine which lines 306 need to be decrypted (e.g., where spacing between encrypted lines 306 may occur in intervals of one, one, two, three, five, eight, etc. lines of payload data 302). Other linear and non-linear mathematical relationships may be used for determining offset, the aforementioned examples merely being exemplary. In some implementations, data from the first segment 304 used for the NONCE (202, FIGS. 2A and 2B) or portions thereof, as opposed to the encryption keys (206, FIGS. 2A and 2B) may be used to determine this varying offset. For example, the first ten pixel values within the first segment may be fed into a linear feedback shift register (LFSR), with the resultant output from the LFSR being utilized for placement of encrypted lines 306. These and other variants would be readily apparent to one of ordinary skill given the contents of the present disclosure.

In some implementations, a so-called "honey pot" mechanism may be implemented. As a brief aside, in some authoritarian regimes it may be advantageous to disguise the presence of encrypted frames of data 300 within the image capture device 100. In other words, upon inspection of data resident within, for example, a memory device 118 associated with the image capture device 100 an individual may determine that there is encrypted data stored in memory. Accordingly, in the aforementioned situation, the authorities may demand that either the encrypted data be un-encrypted for review, or alternatively, the encrypted data (and/or the image capture device 100 itself) be confiscated. Such an outcome may obviously be undesirable for, for example, the owner of the image capture device 100. Accordingly, in some implementations it may be desirable to disguise the presence of this encrypted data.

One such schema may be to insert a reference or pointer within the frame(s) of encrypted data 300. This reference or pointer may point to another location within memory where otherwise benign or other desired content may be stored. For example, attempting to access a first media file, that is otherwise encrypted, without possessing or entering the appropriate encryption key(s) (206, FIGS. 2A and 2B) may cause the image capture device (100, FIG. 1) to access a second media file located within memory. This reference or pointer to the second media file may be resident in an unencrypted portion (e.g., the NALU 310) of the frame(s) of encrypted data 300. Another such schema may be to insert a reference or pointer within an encrypted portion of the frame(s) of encrypted data 300. Similar to that mentioned supra, this reference or pointer may point to another location within memory where otherwise benign or other desired content may be stored. For example, attempting to access a first media file, that is otherwise encrypted, without possessing or entering the appropriate encryption key(s) (206, FIGS. 2A and 2B) may cause the image capture device (100, FIG. 1) to access a second media file located within memory. However, accessing this second media file may require the entering of other "dummy" or default encryption key(s).

Yet another such schema may be to insert a second unencrypted (or encrypted with a "dummy" or default encryption key(s)) media file within the primary encrypted media file itself. In other words, without necessitating a reference or pointer to another location within memory. These and other variations would be readily apparent to one of ordinary skill given the contents of the present disclosure. One such downside to the implementation of such a honey pot scheme may be the increased storage requirements for the insertion of this "fake" media; however, decryption may still be performed in place. In addition, the insertion of low resolution media, static images, messages, logos and the like may require very little memory in terms of data storage (e.g., two percent), although more complex, larger storage requirement media may of course be readily substituted depending upon the desired usage scenario for the image capture device.

Encrypting/Decrypting Methodologies—

Figure 4:
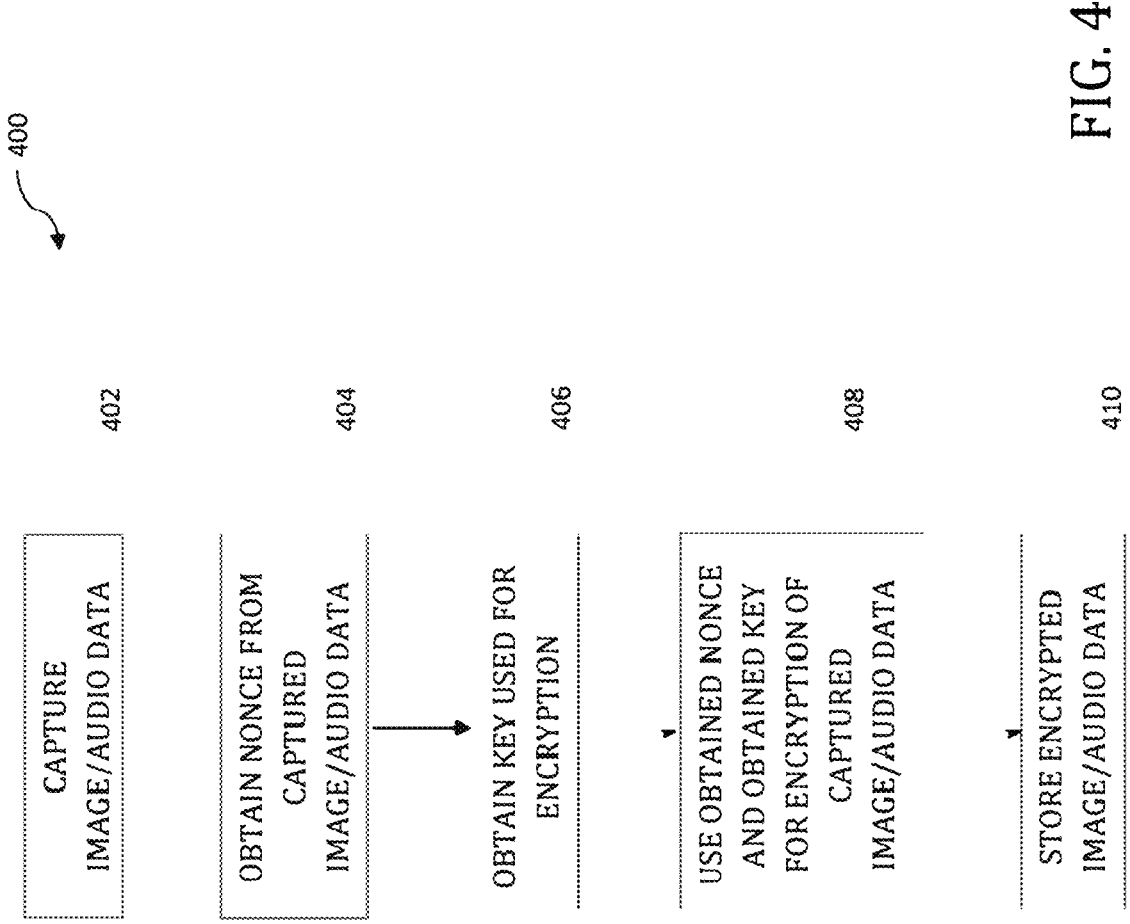
FIG. 4 is a logical flow diagram illustrating an exemplary methodology for the storing of encrypted image/audio data, useful in describing the principles of the present disclosure.

Referring now to FIG. 4, an exemplary logical flow diagram illustrating an exemplary methodology 400 for the storing of encrypted image/audio data is shown and described in detail. At operation 402, imaging and/or audio data (collectively, "media") is captured. This captured media may be obtained using a variety of types of image capture devices (e.g., cameras). For example, panoramic captured media may be obtained using, for example, the GoPro Fusion® series of cameras manufactured by the Assignee hereof. As but one other non-limiting example, captured media may be obtained using, for example, a GoPro Hero® series of cameras manufactured by the Assignee hereof. These and other variations would be readily apparent to one of ordinary skill given the contents of the present disclosure.

At operation 404, a NONCE may be obtained from the captured media content. For example, a line (or segment) within the captured media content may be used as a NONCE value for the encryption of the captured media. In other words, and as described supra, every captured frame (or image) may be considered unique, and hence this imaging data provides for the random nature required for its use as a NONCE. Additionally, this captured media may be made more random by, for example, imaging sensor noise that is common to, for example, all image capture devices.

At operation 406, an encryption key used for encryption is obtained. For example, the encryption key(s) may be entered in locally on the image capture device via any suitable user interface located on the image capture device itself. The encryption key(s) may also be stored as an image file (e.g., a QR code) and may be entered (e.g., captured) via, for example, the lenses of the image capture device itself. In additional to local acquisition (e.g., via the image capture device itself), in some implementations, it may be desirable for the encryption key(s) to be stored remotely. For example, the encryption key(s) may only be accessible through, for example, a secure VPN tunnel. Access to the secure VPN tunnel may use a variety of authentication methods including, without limitation, passwords, tokens and/or other unique identification methods. In some implementations, the encryption key(s) may be generated by a remote computing device (e.g., a smartphone, laptop, desktop, or other computing device) and may be transmitted/received via a variety of wired and/or wireless interfaces. These and other variants would be readily apparent to one of ordinary skill given the contents of the present disclosure.

At operation 408, the obtained NONCE and the obtained encryption key(s) may be used for the encryption of the captured media. Advantageously, the obtained NONCE and the obtained encryption key(s) may be used in place (e.g., at time of image capture) so that the captured media is encrypted prior to, for example, mp4 multiplexing and media storage at operation 410.

Figure 5:
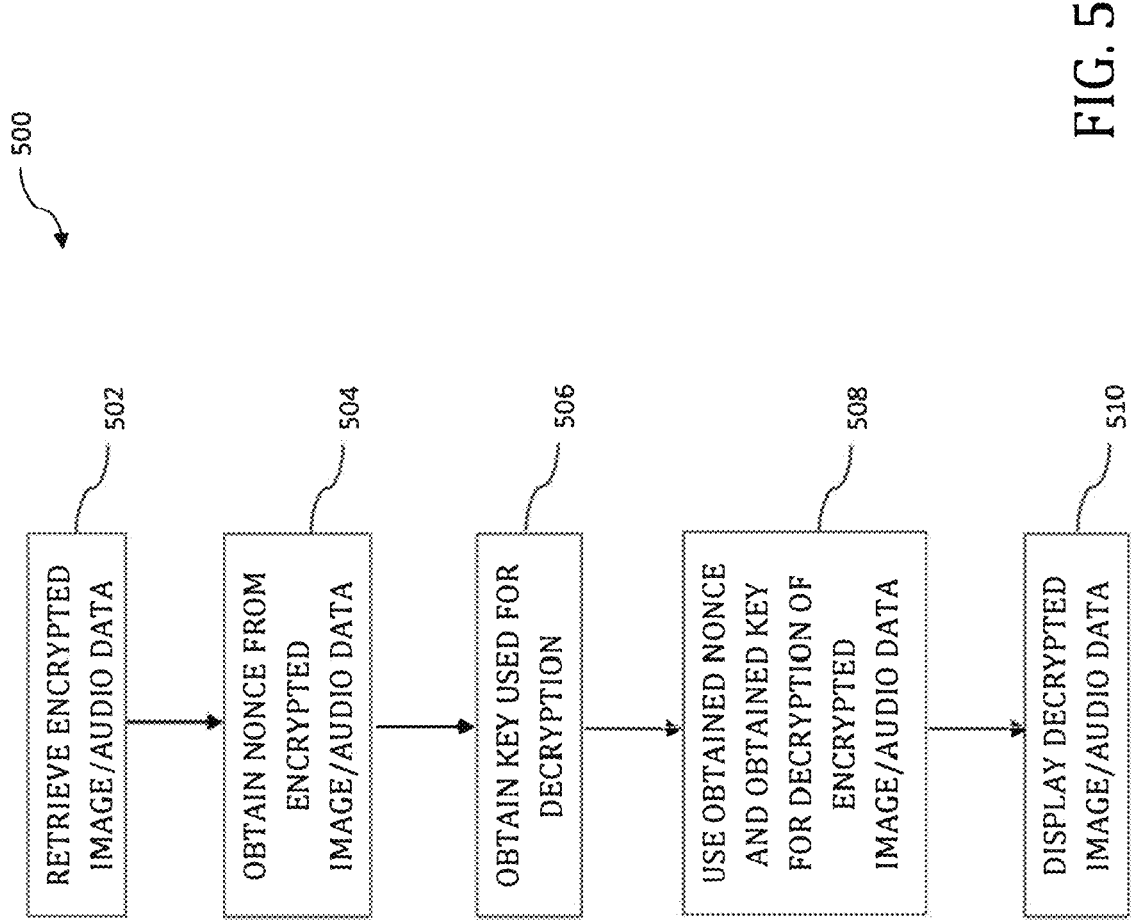
FIG. 5 is a logical flow diagram illustrating an exemplary methodology for the display of decrypted image/audio data, useful in describing the principles of the present disclosure.

Referring now to FIG. 5, a logical flow diagram illustrating an exemplary methodology 500 for the display of decrypted image and/or audio data ("media") is shown and described in detail. At operation 502, the encrypted media is retrieved from storage. At operations 504 and 506, the NONCE and encryption key(s) are retrieved and the retrieved NONCE and encryption key(s) are used for decryption of the encrypted media at operation 508. Advantageously, the use of the obtained NONCE and encryption key(s) may enable the encrypted media to be decrypted in place (i.e., on the image capture device itself). In some implementations, the encrypted media may be transferred to a remote computing system where decryption is performed. At operation 510, the decrypted media may be displayed. The display of the decrypted media at operation 510 may occur locally (e.g., on the image capture device), or alternatively, may occur on a remote display (e.g., a display of a remote computing device).

Exemplary Apparatus—

Figure 6:
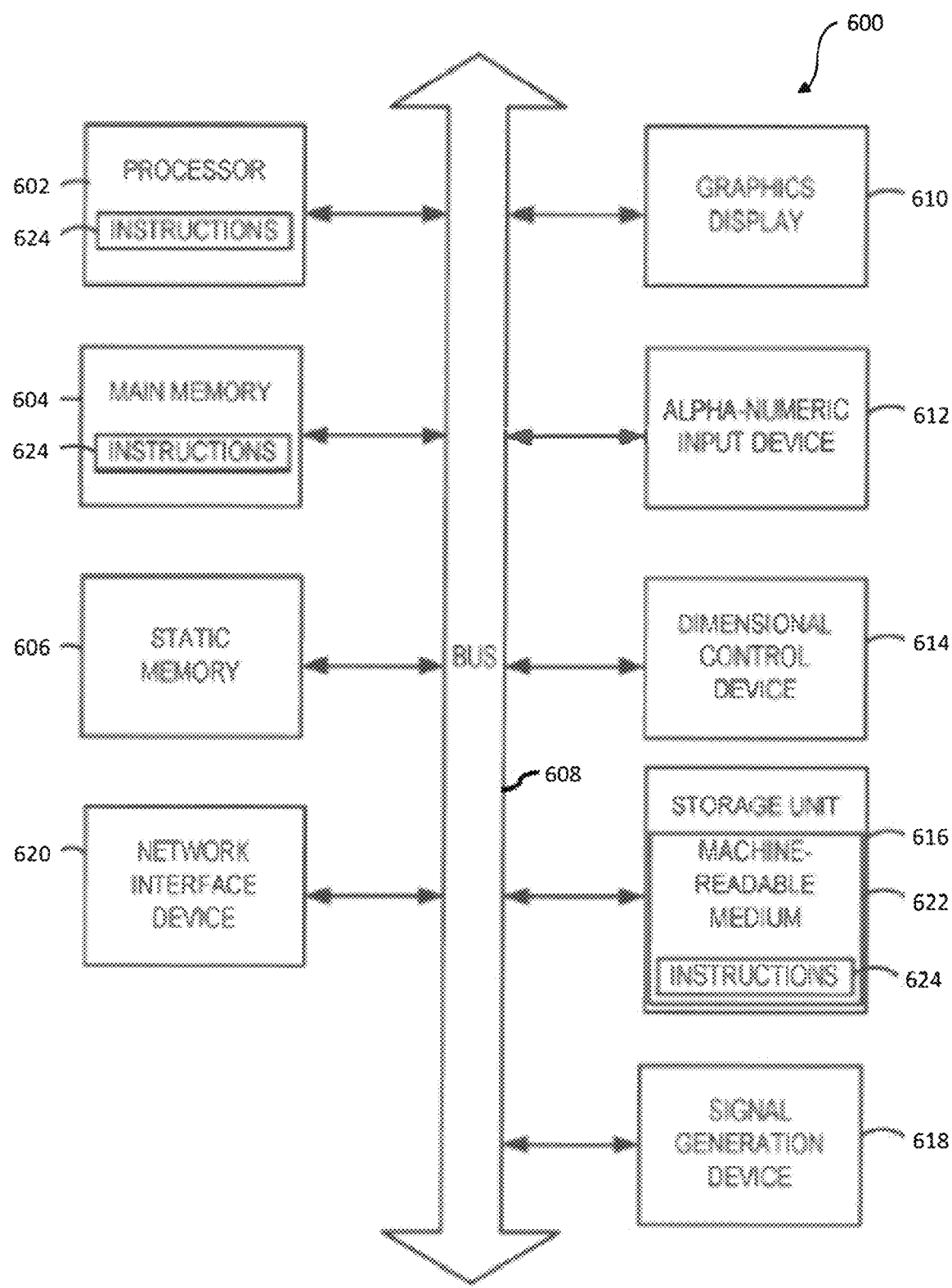
FIG. 6 is a block diagram of an exemplary implementation of a computing device, useful in encrypting and/or decrypting captured content, useful in describing the principles of the present disclosure.

FIG. 6 is a block diagram illustrating components of an example computing system 600 able to read instructions from a computer-readable medium and execute them in one or more processors (or controllers). The computing system 600 in FIG. 6 may represent an implementation of, for example, an image capture device (100, FIG. 1) for encrypting and/or decrypting of a captured image. The computing system 600 may include a separate standalone computing device (e.g., a laptop, desktop, server, etc.) in some implementations.

The computing system 600 may be used to execute instructions 624 (e.g., program code or software) for causing the computing system 600 to perform any one or more of the encrypting/decrypting methodologies (or processes) described herein. The computing system 600 may include, for example, an action camera (e.g., a camera capable of capturing, for example, a 360° FOV), a personal computer (PC), a tablet PC, a notebook computer, or other device capable of executing instructions 624 (sequential or otherwise) that specify actions to be taken. In another embodiment, the computing system 600 may include a server. In a networked deployment, the computing system 600 may operate in the capacity of a server or client in a server-client network environment, or as a peer device in a peer-to-peer (or distributed) network environment. Further, while only a single computer system 600 is illustrated, a plurality of computing systems 600 may operate to jointly execute instructions 624 to perform any one or more of the encrypting and/or decrypting methodologies discussed herein.

The example computing system 600 includes one or more processing units (generally processor apparatus 602). The processor apparatus 602 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 600 may include a main memory 604. The computing system 600 may include a storage unit 616. The processor 602, memory 604 and the storage unit 616 may communicate via a bus 608. One or more of the storage unit 616, main memory 604, and static memory 606 may be utilized to store, inter alia, encrypted media (e.g., image data and/or audio data).

In addition, the computing system 600 may include a display driver 610 (e.g., to drive a plasma display panel (PDP), a liquid crystal display (LCD), a projector, or other types of displays). The computing system 600 may also include input/output devices, e.g., an alphanumeric input device 612 (e.g., touch screen-based keypad or an external input device such as a keyboard), a dimensional (e.g., 2-D or 3-D) control device 614 (e.g., a touch screen or external input device such as a mouse, a trackball, a joystick, a motion sensor, or other pointing instrument), a signal capture/generation device 618 (e.g., a speaker, camera, and/or microphone), and a network interface device 620, which also are configured to communicate via the bus 608.

Embodiments of the computing system 600 corresponding to a client device may include a different configuration than an embodiment of the computing system 600 corresponding to a server. For example, an embodiment corresponding to a server may include a larger storage unit 616, more memory 604, and a faster processor 602 but may lack the display driver 610, input device 612, and dimensional control device 614. An embodiment corresponding to an action camera may include a smaller storage unit 616, less memory 604, and a power efficient (and slower) processor 602 and may include multiple image capture devices 618 (e.g., to capture 360° FOV images or video).

The storage unit 616 includes a computer-readable medium 622 on which is stored instructions 624 (e.g., a computer program or software) embodying any one or more of the methodologies or functions described herein. The instructions 624 may also reside, completely or at least partially, within the main memory 604 or within the processor 602 (e.g., within a processor's cache memory) during execution thereof by the computing system 600, the main memory 604 and the processor 602 also constituting computer-readable media. The instructions 624 may be transmitted or received over a network via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store the instructions 624. The term "computer-readable medium" shall also be taken to include any medium that is capable of storing instructions 624 for execution by the computing system 600 and that cause the computing system 600 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, image capture devices (e.g., cameras), personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method for encrypting captured media, the method comprising:
   capturing content using an image capture apparatus, the captured content including a video, the video including an image;
   obtaining a segment of the image as a number used only once (NONCE) value, wherein uniqueness of the image from other images results in the segment of the image having random nature required for use as the NONCE value; and
   encrypting one or more portions of the captured content based on the NONCE value obtained from the segment of the image, wherein a first portion of the video is encrypted while a second portion of the video is not encrypted, further wherein encryption of the first portion of the video prevents decoding of the second portion of the video that is not encrypted;
   wherein:
     the captured content includes a sequence of frames;
     the sequence of frames includes the image as an I-frame and one or more following P-frames or one or more following B-frames; and
     the NONCE value obtained from the segment of the image is used for encryption of the sequence of frames such that the NONCE value obtained from the segment of the image is used for encryption of the one or more following P-frames or the one or more following B-frames.

2. The method of claim 1, wherein amount of spacing between encrypted portions of the video and unencrypted portions of the video is fixed.

3. The method of claim 1, wherein amount of spacing between encrypted portions of the video and unencrypted portions of the video is varied.

4. The method of claim 1, wherein amount of spacing between encrypted portions of the video and unencrypted portions of the video is determined based on the NONCE value obtained from the segment of the image or an encryption key.

5. The method of claim 1, wherein the captured content is encrypted further based on an encryption key.

6. The method of claim 1, wherein the segment of the image obtained as the NONCE value is a line of the image.

7. The method of claim 1, wherein:
   the captured content further includes audio; and
   the audio is encrypted based on the NONCE value obtained from the segment of the image.

8. The method of claim 1, wherein:
   the captured content further includes audio; and
   the audio is encrypted based on a separate NONCE value obtained from a segment of the audio.

9. A system for encrypting captured media, the system comprising:
   one or more processors;
   a lens having a field of view;
   an image sensor configured to capture images or videos via use of the lens; and
   a computer-readable medium comprising instruction which are configured to, when executed by the one or more processors, cause the system to:
     capture content using the image sensor, the captured content including a video, the video including an image;
     obtain a segment of the image as a number used only once (NONCE) value, wherein uniqueness of the image from other images results in the segment of the image having random nature required for use as the NONCE value; and
     encrypt one or more portions of the captured content based on the NONCE value obtained from the segment of the image, wherein a first portion of the video is encrypted while a second portion of the video is not encrypted, further wherein encryption of the first portion of the video prevents decoding of the second portion of the video that is not encrypted;
   wherein:
     the captured content includes a sequence of frames;
     the sequence of frames includes the image as an I-frame and one or more following P-frames or one or more following B-frames; and
     the NONCE value obtained from the segment of the image is used for encryption of the sequence of frames such that the NONCE value obtained from the segment of the image is used for encryption of the one or more following P-frames or the one or more following B-frames.

10. The system of claim 9, wherein amount of spacing between encrypted portions of the video and unencrypted portions of the video is fixed.

11. The system of claim 9, wherein amount of spacing between encrypted portions of the video and unencrypted portions of the video is varied.

12. The system of claim 9, wherein amount of spacing between encrypted portions of the video and unencrypted portions of the video is determined based on the NONCE value obtained from the segment of the image or an encryption key.

13. The system of claim 9, wherein the captured content is encrypted further based on an encryption key.

14. The system of claim 9, wherein the segment of the image obtained as the NONCE value is a line of the image.

15. The system of claim 9, wherein:
the captured content further includes audio; and
the audio is encrypted based on the NONCE value obtained from the segment of the image.

16. The system of claim 9, wherein:
the captured content further includes audio; and
the audio is encrypted based on a separate NONCE value obtained from a segment of the audio.

17. A method for encrypting captured media, the method comprising:
capturing content using an image capture apparatus, the captured content including a video, the video including an image;
obtaining a segment of the image as a number used only once (NONCE) value, wherein the segment of the image obtained as the NONCE value is a line of the image and uniqueness of the image from other images results in the segment of the image having random nature required for use as the NONCE value; and
encrypting one or more portions of the captured content based on the NONCE value obtained from the segment of the image, wherein a first portion of the video is encrypted while a second portion of the video is not encrypted, further wherein encryption of the first portion of the video prevents decoding of the second portion of the video that is not encrypted, wherein amount of spacing between encrypted portions of the video and unencrypted portions of the video is determined based on the NONCE value obtained from the segment of the image or an encryption key;
wherein:
the captured content includes a sequence of frames;
the sequence of frames includes the image as an I-frame and one or more following P-frames or one or more following B-frames; and
the NONCE value obtained from the segment of the image is used for encryption of the sequence of frames such that the NONCE value obtained from the segment of the image is used for encryption of the one or more following P-frames or the one or more following B-frames.

* * * * *